United States Patent [19]

Knauer

[11] Patent Number: 4,931,981
[45] Date of Patent: Jun. 5, 1990

[54] MULTI-PLACE RIPPLE-CARRY ADDER

[75] Inventor: Karl Knauer, Grafing, Fed. Rep. of Germany

[73] Assignee: Siemens Aktiengesellschaft, Berlin and Munich, Fed. Rep. of Germany

[21] Appl. No.: 418,803

[22] Filed: Oct. 4, 1989

Related U.S. Application Data

[63] Continuation of Ser. No. 902,641, Sep. 2, 1986, abandoned.

[30] Foreign Application Priority Data

Sep. 30, 1985 [DE] Fed. Rep. of Germany ....... 3534863

[51] Int. Cl.$^5$ .............................................. G06F 7/50
[52] U.S. Cl. .................................................. 364/784
[58] Field of Search ................................. 364/784–788

[56] References Cited

U.S. PATENT DOCUMENTS

| | | | |
|---|---|---|---|
| 3,843,876 | 10/1974 | Fette et al. | 364/786 |
| 4,052,604 | 10/1977 | Maitland et al. | 364/786 |
| 4,417,314 | 11/1983 | Best | 364/785 |
| 4,425,623 | 1/1984 | Russell | 364/786 |
| 4,439,835 | 3/1984 | Best et al. | 364/786 |
| 4,564,921 | 1/1986 | Suganuma | 364/784 |
| 4,592,007 | 5/1986 | Ohhashi | 364/784 |
| 4,601,007 | 7/1986 | Uya et al. | 364/784 |
| 4,689,763 | 8/1987 | Fang | 364/784 |

Primary Examiner—Gary V. Harkcom
Assistant Examiner—Long T. Nguyen
Attorney, Agent, or Firm—Hill, Van Santen, Steadman & Simpson

[57] ABSTRACT

A multi-place ripple-carry adder adapted for CMOS technology incorporates two types of adder cells in which the adder cells of a first type receive two operand inputs and an inverted carry input signal and produce outputs corresponding to a sum signal and a non-inverted carry output signal. The adder cells of the second type accept two operand inputs and produce, as outputs, a sum signal and a non-inverted carry output signal. The gate arrangements of the adder cells of each type are designed so that the capacitance of the carry output is charged through either one transfer transistor acting as a transfer gate, or through a series connection of two transistors of which one transistor acts as a transfer gate. Both binary values can be transmitted as inverted and non-inverted carry output signals without additional threshold voltage losses. The transfer transistors in the carry propagation path are not component parts of a combination gate within the gate arrangement, so that they can be designed with lower impedance than the remaining transistors, resulting in faster rise times for the output pulses.

4 Claims, 1 Drawing Sheet

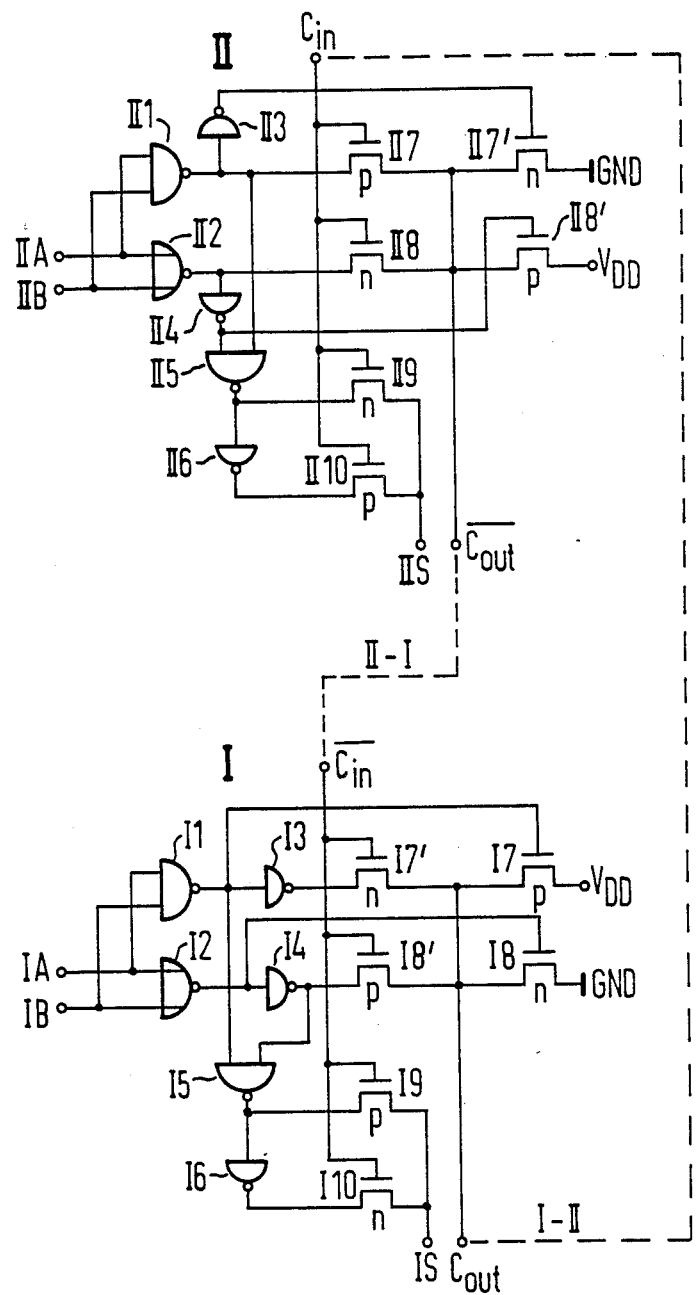

MULTI-PLACE RIPPLE-CARRY ADDER

CROSS REFERENCE TO RELATED APPLICATION

A related application is "Ripple-Carry Adder", Ser. No. 902,745, filed Sept. 2, 1986, now U.S. Pat. No. 4,839,849.

BACKGROUND

The present invention relates to a multi-place ripple-carry adder and more particularly to such an adder which can be embodied in an integrated circuit, using CMOS technology and which is adapted to receive an input carry signal in one polarity and produce an output carry signal which is in the inverted polarity.

Adders are required in a large number of digital logic circuits, for example digital filters, signal processors, and microprocessors. The simplest form for such an adder employs the ripple-carry method, in which a carry signal is serially transmitted from an adder cell for a lower order bit to the adder cell for the next higher order bit. The propagation time for the carry signal essentially defines the addition time. More involved adder constructions such as, for example, the known look-ahead method, are based on elements of the ripple-carry method.

Ripple-carry cells are known, for example from H. W. Weiss, K. Horninger, "Integrierte MOS-Schaltungen", Springer-Verlag, Berlin-Heidelberg, New York (1982), pp. 188–194. In existing adder cell designs, the propagation time required for the carry is a critical factor in the calculating time of an arithmetic unit constructed with such adder cells, and a relatively large number of gates are inserted into the carry propagation path, or the gates in the carry paths are components parts of combination gates. In the former case, the number of gates connected in series has an unfavorable effect on the propagation time of carry signals. In the second case, there is also the unfavorable effect that charging the capacitance of the carry output does not take place with the required edge steepness, due to the relatively high impedance of the gates which are formed as component parts of combination gates.

BRIEF DESCRIPTION OF THE INVENTION

A principal object of the present invention is to provide a multi-place ripple-carry adder, in which the disadvantages of prior constructions with respect to carry paths are effectively avoided, and in which circuit complexity and space required for embodiment in an integrated circuit is considerably reduced.

This object is achieved in the present invention by an adder construction in which the carry output signal is produced by a circuit arrangement which incorporates only one transfer transistor acting as a transfer gate, or by a series connection of two transistors, of which one is a transistor acting as a transfer gate. The transfer transistors are not component parts of any combination gate, so they can be designed with significantly lower-impedance, without limitation due to layout geometry.

These and other objects and advantages of the present invention will become manifest by an examination of the following description and the accompanying drawings.

BRIEF DESCRIPTION OF THE DRAWING

The drawing illustrates a schematic diagram of an illustrative embodiment of the present invention.

DESCRIPTION OF THE PREFERRED EMBODIMENT

The drawing illustrates two types of adder cells which are interconnected, the two types being designated I and II. The type I adder cell accepts the inverted carry signal $\overline{C_{in}}$ and the adder cells of type II receive an non-inverted carry input signal $C_{in}$ at the carry input terminal. The adder cell of type I produces as an output, a non-inverted carry output signal $C_{out}$ at an output terminal, and the adder cells of the second type II produce an inverted carry output signal $\overline{C_{out}}$ at the carry output terminal.

Each type of adder cell incorporates a gate arrangement for two input variables A and B, and an input carry input signal, which may be inverted or non-inverted, as described above. Each adder cell produces two outputs, corresponding to the sum and carry produced in response to the three inputs.

The adder cell of the type I incorporates a gate arrangement gate connected to input terminals for two input variables IA and IB. Each input is connected to two input terminals of a NAND gate I1 and of a NOR gate I2. The output of the NAND gate I1 is connected to the input of a first inverter I3, to a first input of a second NAND gate I5 and to the gate electrode of a first transfer resistor I7 illustrated as a p-channel FET. The output of the NOR gate I2 is connected to the input of a second inverter I4 and to the gate of a second transfer transistor I8, shown as an n-channel FET.

The output of the first inverter I3 is connected to the source electrode of a third transfer transistor I7' shown as an n-channel FET. The output of the second inverter I4 is connected to the source electrode of a fourth transfer transistor I8', shown as a p-channel FET, and to a second input of the NAND gate I5. The output of the NAND gate I5 is connected to the source electrode of a fifth transfer transistor I9 shown as a p-channel FET, and to the input of a third inverter I6. The output of the inverter I6 is connected to the source electrode of a sixth transfer resistor I10 shown as an n-channel FET. The source electrode of the first transfer transistor I7 is connected to a source of operating voltage potential $V_{DD}$, and the source electrode of the second transfer transistor I8 is connected to ground. The drain electrodes of the first through fourth transfer transistors I7, I8, I7', I8' are connected in common to the output terminal for the non-inverted carry output signal $C_{out}$. The drain electrodes of the fifth and sixth transistors I9 and I10 are connected in common to the output terminal for the sum signal IS. The gate electrodes of the third, fourth, fifth, and sixth transfer transistors I7', I8', I9 and I10 are connected in common to the input terminal for the inverted carry signal $\overline{C_{in}}$.

The gate arrangement for the adder type I is arranged so that the charging of the capacitance of the carry output takes place through only one transistor I7 or I8 acting as a transfer gate, or on the other hand through the series connection of only two transistors, one being contained in the gates I3 and I4 and the second being formed by a transfer gate I7' or I8'. As the result of the different transmission paths, both the binary values "0" and "1" can be transmitted without additional threshold voltage losses. The transfer transistors I7, I7', I8, and I8' are advantageously not component parts of a combination gate within the gate arrangement, so that these transfer transistors, which have their source-drain paths inserted into the carry propagation paths, can be designed specifically with lower-impedance than the remaining transistors of the overall gate arrangement, without limitation due to the layout geometry on an integrated circuit.

The adder cell of the second type II has a gate arrangement wherein each of the two input terminals for the two variables IIA and IIB are respectively connected to the inputs of a first NAND gate II1 and of the NOR gate II2. The output of the first NAND gate II1 is connected to the input of a first inverter II3, to the source electrode of a first transfer transistor II7, shown as a p-channel FET, and to a first input of a second NAND gate II5. The output of the first inverter II3 is connected to the gate electrode of a second transfer transistor II7′, shown as an n-channel FET. The output of the NOR gate II2 is connected to the source electrode of a third transfer transistor II8, shown as an n-channel FET, and to the input of a second inverter II4. The output of the second inverter II4 is connected to the gate electrode of a fourth transfer transistor II8′, shown as a p-channel FET and to a second input of the second NAND gate II5. The output of the second NAND gate II5 is connected to the gate electrode of a fifth transfer transistor II9, shown as an n-channel FET, and to the input of a third inverter II6. The output of the third inverter II6 is connected to the source electrode of a sixth transfer transistor II10 shown as a p-channel FET.

The source electrode of the second transfer transistor II7′ is connected to ground and the source electrode of the fourth transfer transistor II8′ is connected to a source of operating voltage $V_{DD}$. The drain electrodes of the first, second, third, and fourth transfer transistors II7, II7′, II8, II8′ are connected in common to the output terminal for the inverted carry output signal $\overline{C_{out}}$. The drain electrodes of the fifth and sixth transfer transistors II9 and II10 are connected in common to the output terminal for the sum signal IIS. The gate electrodes of the first, third, fifth and sixth transfer transistors II7, II8, II9, and II10 are connected in common to the input terminal for the non-inverted carry input signal $C_{in}$.

The adder cells of type II exhibit the same advantages as described above in connection with the cells of type I, namely, the provision of transfer transistors II7, II7′, II8 and II8′ as transistors which are not component parts of combination gates, so that their impedance may be designed lower, without restriction by geometry, in an integrated circuit.

The adder cells of the first type I are preferably arranged an odd numbered stages of a multi-stage system, and the adder cells of the second type II are arranged in even numbered Thus, each stage delivers a carry signal of the polarity required for the succeeding stage. The connections between carry inputs and outputs for successive stages of a multi-stage system is shown in the Fig. in dashed lines. One line, indicated as II-I, connects the carry output from a type II adder stage to the carry input of a type I adder stage, and the other dashed line, labeled I-II, connects a carry output of a type I stage to the carry input of a type II stage.

The adder types illustrated in the Fig. each require only 24 transistors, which results in a considerable space saving in comparison to previous arrangements, which require at least 28 transistors. In addition, only two source/drain paths are connected in series in the time-critical carry propagation paths, and one of these source/drain paths can be made in the form of a low-impedance device without considering the layout geometry.

It is apparent that various modifications and additions may be made in the apparatus of the present invention without departing from the essential features of novelty thereof, which are intended to be defined and secured by the appended claims.

What is claimed is:

1. A multiple place ripple-carry adder suitable for CMOS technology comprising two types of adder cells, the adder cells of the first type connected to receive two operand input signals and an inverted carry signal, and to produce output signals corresponding to the sum and the non-inverted carry output in accordance with said inputs, the adder cells of said second type being connected to receive first and second operand inputs and a non-inverted carry signal and to produce sum and inverted carry output signals in response to said first and second operand inputs and a non-inverted carry signal, each type of adder cell comprising a carry gate arrangement for producing its said carry output signal, said carry gate arrangement incorporating first means to manifest said carry output from said carry input through only a single transfer transistor acting as a transfer gate, and second means to manifest said carry output through a series connection of two transistors, one of said two transistors being a transfer gate, said transistor of said transfer gate not being a component part of a combination gate within the carry gate arrangement, whereby said transfer transistors of said carry gate arrangement have signifcantly lower impedance than the other transistors of said carry gate arrangement.

2. Apparatus according to claim 1, wherein the adder cell of said first type comprises a gate arrangement having a first NAND gate and a NOR gate connected to both of said operand inputs, a first inverter connected to the output of said first NAND gate, a second NAND gate having one input connected to the output of said first NAND gate, a first transfer transistor comprising a p-channel FET having its gate connected to the output of said first NAND gate, a second inverter connected to the output of said NOR gate, a second transfer transistor comprising an n-channel FET having its gate connected to the output of said NOR gate, a third transfer transistor comprising an n-channel FET having its source electrode connected to the output of said first inverter, a fourth transfer transistor comprising a p-channel FET having a source electrode connected to the output of said second inverter, a fifth transfer transistor comprising a p-channel FET having a source terminal connected to the output of said second NAND gate, a third inverter connected to the output of said second NAND gate, and a sixth transfer transistor having its source electrode connected to the output of said third inverter, means for connecting the drain electrodes of said first, second, third and fourth transfer transistors to said non-inverted carry output, means for connecting the drain electrodes of said fifth and sixth transfer transistors to said sum output, means for connecting the gate inputs of said third, fourth, fifth and sixth transfer transistors to said inverted carry input, means for connecting the source electrode of said first transfer gate to a source of operating potential, and means for connecting the source electrode of said second transfer gate to a reference potential.

3. Apparatus according to claim 1, wherein the adder cell of said second type comprises a first NAND gate and a NOR gate, each of which is connected to both of said operand inputs, a first inverter connected to the output of said first NAND gate, a first transfer transistor comprising an n-channel FET having its gate connected to the output of said first inverter, a second NAND gate having one input connected to the output of said first NAND gate, a second inverter connected to the output of said NOR gate, the output of said second inverter being connected to a second input of said second NAND gate, a second transfer transistor comprising a p-channel FET having its gate connected to the output of said second inverter, a third transfer transistor comprising a p-channel FET having its source electrode connected to the output of said first NAND gate, a fourth transfer transistor comprising an n-channel FET having a source electrode connected to the output of said NOR gate, a fifth transfer transistor comprising an n-channel FET having its source electrode connected to the output of said second NAND gate, and a sixth transfer transistor comprising a p-channel FET having its source electrode connected to the output of said second NAND gate through an inverter, means for connecting the drain electrodes of said first, second, third and fourth transfer transistors to produce an inverted carry output signal, means for connecting the drain electrodes of said fifth and sixth transfer transistors to produce said sum signal, means for connecting the gate electrodes of said third, fourth, fifth and sixth transfer transistors to receive said non-inverted carry input signal, the source electrode of said first transfer transistor being connected to a reference potential, and the source electrode of said second transfer transistor being connected to a source of operating potential.

4. Apparatus according to claim 1, in which a plurality of adder cells of said first type are arranged in uneven numbered stages and adder cells of said second type are arranged in even numbered stages of a multi-stage adder, and including means for connecting the carry output signal of each stage to the carry input signal of each succeeding stage.

* * * * *